N. P. BRADISH.
Sewing Machine.
No. 94,467.
Patented Sept. 7, 1869.
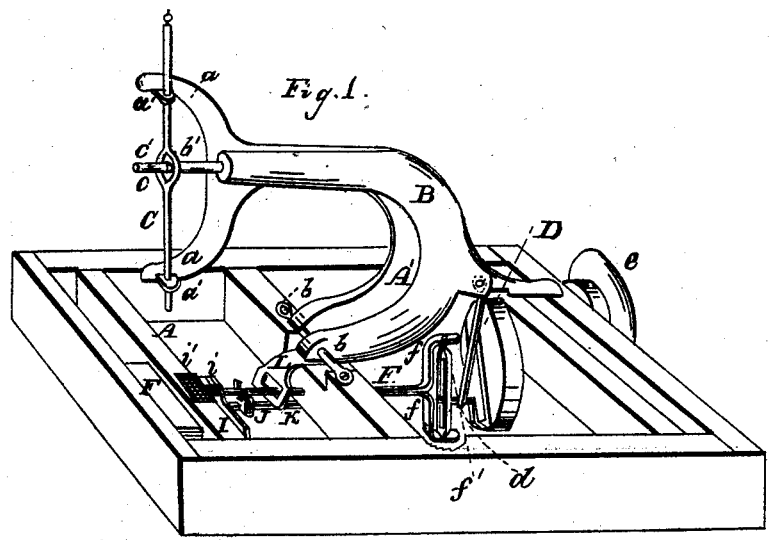
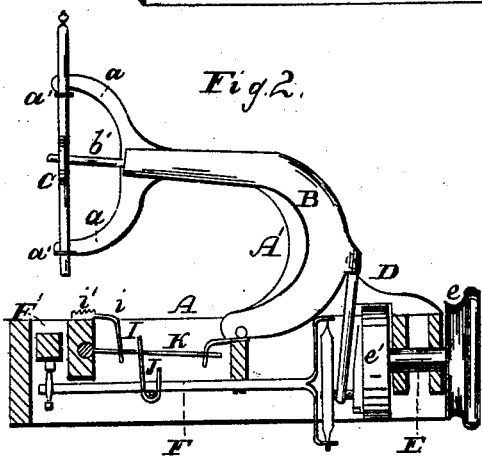
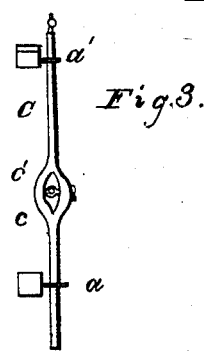
Witnesses.
Inventor.

United States Patent Office.

N. P. BRADISH, OF JERSEYVILLE, ILLINOIS.

Letters Patent No. 94,467, dated September 7, 1869.

IMPROVEMENT IN SEWING-MACHINE.

The Schedule referred to in these Letters Patent and making part of the same.

*To all whom it may concern:*

Be it known that I, N. P. BRADISH, of Jerseyville, in the county of Jersey, and State of Illinois, have invented a new and useful Improvement in Sewing-Machines; and I do hereby declare that the following is a full and exact description of the same, reference being had to the accompanying drawings, and to the letters of reference marked thereon.

This invention relates to an improved sewing-machine; and consists mainly in certain devices for operating the shuttle and feeding-bar, and also, in the manner of connecting the pitman to the operating-arm, and the operating-arm to the needle-bar. The details of construction, and manner of operation, will be fully described hereinafter.

In the drawings—

Figure 1 represents a perspective view;
Figure 2, a side elevation; and
Figure 3, a view of the needle-bar.

To enable those skilled in the art to which my invention appertains to make and use the same, I will now proceed to describe its construction and operation.

A represents the table or bed-plate of the machine, from which rises the standard A', having the arms *a a*.

To the latter are attached the guides *a' a'*, in which the needle-bar moves vertically.

B represents a curved rim, pivoted at *b* to the bed-plate, the upper end of which is provided with a rod, *b'*, which fits snugly into the pivoted socket *c'* of the needle-bar. This rim is pivoted by means of a pointed shaft which extends through it, and rests in corresponding sockets on each, the arrangement being such that one or both of these sockets may be advanced as the bearing becomes worn.

C represents the needle-bar, sliding vertically in the guides *a' a'*, of the standard A', which is provided with an eye, *c*, within which is located the pivoted socket *c'* as shown. The bearing upon one side of the socket is made in a set-screw, by turning which the wearing away of the bearing is provided for.

D represents the pitman, by means of which the arm B is actuated. It is provided at each end with a spherical head or ball (the lower one being located upon an arm, at right angles to the pitman,) which is held in a corresponding socket, the latter being made in two parts, one of which is removable for the purpose of permitting the ball to be inserted. The loose half of the socket is secured to the other by means of a set-screw. By this an adjustment is rendered possible as the bearing becomes worn.

E represents the main shaft, which is provided with the pulley or hand-wheel *e*, and the disk *e'*, to which latter the pitman is eccentrically attached, as before described.

F is a bar, pivoted beneath the bed-plate, by means of which the shuttle and feed-bar are operated.

This bar is provided with arms, *f f*, between which is pivoted the slotted-bar *f'*, as shown, in which latter moves the stud *d*, attached to the pitman D.

It will be observed that by this arrangement the bar F is moved from side to side as the pitman ascends and descends.

The forward end of the bar F is connected with the shuttle F' in the same way that the arm B is connected to the needle-bar, as before described.

I represents the feed-bar, having the bent arm *i*, and feed-plate *i'*. This bar is slotted where it is attached to the table, for the purpose of permitting the necessary lateral movement.

Motion is communicated to it from the bar F, by means of an adjustable fork, J, which clasps the rod K. By moving the fork upon the bar F, the stitch may be lengthened or shortened, as desired.

The rod K is pivoted in the frame of the machine, as shown, by means of a ball upon its end, and a socket joint.

It passes through the free end of the needle-bar, and extending rearwardly, rests in the slotted end of the curved arm L attached to the lower end of arm B.

By this latter connection the necessary vertical movement is given to the feeding-plate, for, as the arm B vibrates, the arm L necessarily rises and falls with it, and communicates a corresponding motion to the rod K, which passes through the free end of the needle-bar, as before described.

From this description the operation of my improved machine will be readily understood.

Motion having been communicated to the main shaft in any suitable manner, the arm B is operated by the pitman D. From the arm B, the needle-bar is given the necessary vertical movement. At the same time the bar F is moved laterally by means of the stud *d*, upon the pitman, and the shuttle and needle-bar are thus properly adjusted at the right moment. The latter also secures the necessary vertical movement, by means of which it is alternately pressed down upon and lifted from the cloth, by means of the curved arm L. By the construction and arrangement herein described, a simple and effective machine is produced. The connections especially permit the necessary play with the smallest amount of friction possible, while provision is made for the wearing of the bearing-surfaces.

Having thus fully described my invention,

What I claim, and desire to secure by Letters Patent of the United States, is—

1. The pitman D, with stud *d*, in combination with the slotted-bar *f''* of the bar F, substantially as described.

2. The sewing-machine described, consisting of the table A, standard A', arm B, needle-bar C, pitman D, shaft E, bar F, needle-bar I, adjustable fork J, and slotted-arm K, when connected and combined as described, and operated in the manner and for the purpose set forth.

This specification, signed and witnessed, this 7th day of November, 1868.

N. P. BRADISH.

Witnesses:
GEO. W. WARE,
B. M. KRUMPAUDZKY.